United States Patent
Lee et al.

(10) Patent No.: US 11,218,554 B2
(45) Date of Patent: Jan. 4, 2022

(54) METHOD AND APPARATUS FOR DATA TRANSMISSION IN WIRELESS LOCAL ACCESS NETWORK

(71) Applicants: Hyundai Motor Company, Seoul (KR); Kia Motors Corporation, Seoul (KR); Industry-University Cooperation Foundation Hanyang University, Seoul (KR)

(72) Inventors: Sang Sun Lee, Seoul (KR); Sung Chui Pyo, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/864,503

(22) Filed: May 1, 2020

(65) Prior Publication Data
US 2020/0351357 A1   Nov. 5, 2020

(30) Foreign Application Priority Data

May 3, 2019   (KR) .................. 10-2019-0052451
Apr. 16, 2020 (KR) .................. 10-2020-0045938

(51) Int. Cl.
*H04L 29/08* (2006.01)
*H04W 4/40* (2018.01)
*H04W 4/50* (2018.01)
*H04W 4/14* (2009.01)
*H04W 84/12* (2009.01)

(52) U.S. Cl.
CPC ............... *H04L 67/16* (2013.01); *H04W 4/40* (2018.02); *H04W 4/50* (2018.02); *H04W 4/14* (2013.01); *H04W 84/12* (2013.01)

(58) Field of Classification Search
CPC .......... H04L 67/16; H04W 4/40; H04W 4/50; H04W 4/14; H04W 84/12; H04W 4/80; H04W 88/06
See application file for complete search history.

(56) References Cited

U.S. PATENT DOCUMENTS

2017/0272913 A1* 9/2017 Yamashiro ............ H04W 4/029
2018/0270633 A1* 9/2018 Yamashiro ............ H04M 11/00

* cited by examiner

*Primary Examiner* — Joseph E Dean, Jr.
(74) *Attorney, Agent, or Firm* — Mintz Levin Cohn Ferris Glovsky and Popeo, P.C.; Peter F. Coriess

(57) ABSTRACT

An operation method of a first communication node in a communication network identifies a number of second communication nodes receiving messages in a first reception mode and a number of third communication nodes receiving messages in a second reception mode. A transmission mode is determined for transmitting a wireless access in vehicular environments service advertisement (WSA) message based on the identified numbers. A transmission period is then determined for transmitting the WSA message based on the transmission mode. The WSA message is transmitted based on the transmission mode and the transmission period. A protocol used for the first reception mode is different from a protocol used for the second reception mode.

17 Claims, 10 Drawing Sheets

METHOD AND APPARATUS FOR DATA TRANSMISSION IN WIRELESS LOCAL ACCESS NETWORK

CROSS-REFERENCE TO RELATED APPLICATIONS

This application claims priority to Korean Patent Applications No. 10-2019-0052451 filed on May 3, 2019 and No. 10-2020-0045938 filed on Apr. 16, 2020, the entire contents of which are hereby incorporated by reference.

BACKGROUND

1. Technical Field

The present disclosure relates to a method and an apparatus for transmitting data in a wireless local access network, and more particularly to an operation method of a communication node transmitting a wireless access in vehicular environment (WAVE) service advertisement (WSA) message.

2. Related Art

Recently, with the development of mobile devices, wireless LAN (WLAN) technology, which provides fast wireless Internet service to mobile devices, is being enhanced. The WLAN technology is a technology that enables mobile devices such as smart phones, smart pads, laptop computers, portable multimedia players, embedded devices, and the like to wirelessly connect to the Internet based on wireless communication technology at a short range.

Early WLAN technology used a 2.4 GHz frequency band through Institute of Electrical and Electronics Engineers (IEEE) 802.11 to support a rate of 1 to 2 Mbps based on frequency hopping, spread spectrum, infrared communication, and the like. Recently, orthogonal frequency division multiplex (OFDM) scheme is applied to support a rate of up to 54 Mbps. In addition, the IEEE 802.11 is realizing or developing standards for various technologies such as Quality of Service (QoS) enhancement, access point (AP) protocol compatibility, security enhancement, radio resource measurement, wireless access vehicular environment (WAVE), fast roaming, mesh network, interworking with external networks, and wireless network management.

Among various IEEE 802.11 standards, IEEE 802.11b supports a communication rate of up to 11 Mbps using the 2.4 GHz frequency band. IEEE 802.11a, commercialized after the IEEE 802.11b, reduced impact of interferences compared to the congested 2.4 GHz frequency band using a 5 GHz frequency band instead of the 2.4 GHz frequency band, and improved the communication rate to the maximum of 54 Mbps by using the OFDM technology. However, the IEEE 802.11a has a shorter communication range than the IEEE 802.11b. Additionally, IEEE 802.11g, like the IEEE 802.11b, uses the 2.4 GHz frequency band to realize a communication rate of up to 54 Mbps. The EEE802.11g has received considerable attention according to its backward compatibility, which is superior to the IEEE 802.11a also in aspect of a communication range.

In addition, IEEE 802.11n is a technical standard established to overcome the limitation on the communication rate, which has been pointed out as a weak point of the WLAN. The IEEE 802.11n aims to increase the speed and reliability of network and to extend the operating range of wireless networks. More specifically, the IEEE 802.11n supports high throughput (HT) with a data throughput of up to 540 Mbps and is based on Multiple Inputs and Multiple Outputs (MIMO) technology which uses multiple antennas at both a transmitter side and a receiver side to minimize transmission errors and optimize data rates. Additionally, this standard uses a coding scheme of transmitting multiple duplicate copies to increase data reliability, and may also use the OFDM to increase a transmission speed.

As the spread of WLAN is activated and applications are diversified, there was a need for new WLAN systems to support a very high throughput (VHT) than the data throughput supported by the IEEE 802.11n. Among such, the new WLAN systems, IEEE 802.11ac supports a wide bandwidth (80 MHz to 160 MHz) at the 5 GHz frequency band. The IEEE 802.11ac standard is defined only in the 5 GHz frequency band, but for backward compatibility with products supporting the existing 2.4 GHz frequency band, early IEEE 802.11ac chipsets also support operations in the 2.4 GHz frequency band. In particular, the IEEE 802.11ac supports a bandwidth of up to 40 MHz at the 2.4 GHz frequency band.

Theoretically, according to this standard, a WLAN speed of a multiple link terminal may be at least 1 Gbps, and a maximum single link speed may be at least 500 Mbps. This is accomplished by extending the concept of wireless interfaces adopted by the IEEE 802.11n, such as wider radio frequency bandwidth (up to 160 MHz), more MIMO spatial streams (up to eight), multi-user MIMO, and higher density modulation (up to 256 QAM). In addition, there is IEEE 802.11ad as a scheme of transmitting data using a 60 GHz frequency band instead of the existing 2.5 GHz/5 GHz bands. The IEEE 802.11ad is a transmission standard that provides a communication rate up to 7 Gbps using beamforming technology, and is suitable for large amounts of data or high bitrate video streaming such as uncompressed HD video. However, the 60 GHz frequency band is difficult to pass through obstacles, and thus only capable of being used between devices in a short range.

Meanwhile, the IEEE 802.11p is a standard developed for intelligent transport system (ITS) communication. The IEEE 802.11p uses the physical layer of the IEEE 802.11a, and the MAC layer of the IEEE 802.11p adopts an Enhanced Distributed Channel Access (EDCA) of the IEEE 802.11e. Furthermore, the IEEE 802.11bd, an improved version of the IEEE 802.11p, is being developed as a communication standard for the ITS. Accordingly, terminals using the IEEE 802.11p and terminals using the IEEE 802.11bd may coexist in a wireless LAN network. In the future, when the IEEE 802.11bd standardization is completed and the terminals using the IEEE 802.11bd are mass-produced and used, various problems may occur in relation to the legacy terminals using the existing IEEE 802.11p.

SUMMARY

An object of the present disclosure is directed to solving the problems caused by coexistence of terminals using the IEEE 802.11p and terminals using the IEEE 802.11bd in a wireless LAN network.

According to exemplary embodiments of the present disclosure, an operation method of a first communication node in a communication network may include identifying a number of second communication nodes configured to receive messages in a first reception mode and a number of third communication nodes configured to receive messages in a second reception mode; determining a transmission mode for transmitting a wireless access in vehicular environments service advertisement (WSA) message based on the identified numbers; determining a transmission period for transmitting the WSA message based on the transmission mode; and transmitting the WSA message based on the transmission mode and the transmission period, wherein a protocol used for the first reception mode is different from a protocol used for the second reception mode.

The WSA message may further include service information for the second communication nodes or service information for the third communication nodes. The transmission mode may be determined as a first transmission mode when only the second communication nodes exist in the communication network, the transmission mode may be determined as a second transmission mode when only the third communication nodes exist in the communication network, and the transmission mode may be determined as a third transmission mode when the second communication nodes and the third communication nodes coexist in the communication network.

The WSA message only for the second communication nodes may be transmitted during the transmission period, when the transmission mode is the first transmission mode. The WSA message only for the third communication nodes may be transmitted during the transmission period, when the transmission mode is the second transmission mode. The WSA message only for the second communication nodes, the WSA message only for the third communication nodes, and the WSA message for both of the second communication nodes and the third communication nodes may be transmitted during the transmission period, when the transmission mode is the third communication node.

The transmission period may include a first transmission period in which the WSA message only for the second communication nodes is transmitted, a second transmission period in which the WSA message only for the third communication nodes is transmitted, and a third transmission period in which the WSA message for both of the second communication nodes and the third communication nodes is transmitted, and the first, second, and third periods may be determined based on a number of the second communication nodes and a number of the third communication nodes.

When the number of the second communication nodes is m and the number of the third communication nodes is n, a ratio of the first, second, and third transmission periods may be determined as m:n:(m+n). The WSA message may be transmitted via a control channel (CCH).

According to exemplary embodiments of the present disclosure, an operation method of a first communication node in a communication network may include receiving a wireless access in vehicular environments service advertisement (WSA) message including a first indicator that indicates a transmission mode of the WSA message and a second indicator that indicates a transmission period of the WSA message from a second communication node; identifying the transmission mode of the WSA message indicated by the first indicator, and determining whether the WSA message may be used; in response to determining that the WSA message may be used, identifying the transmission period of the WSA message indicated by the second indicator, and receiving service information included in the WSA message according to the transmission period; and activating a service included in the service information.

The first indicator may include information on a protocol used for a reception operation of the first communication node. The second indicator may include information regarding a number of communication nodes performing a reception operation using a same protocol as the first communication node.

According to exemplary embodiments of the present disclosure, a first communication node forming a communication node may include a processor and a memory configured to store at least one instruction executable by the processor. When executed by the processor, the at least one instruction causes the processor to: identify a number of second communication nodes configured to receive messages in a first reception mode and a number of third communication nodes configured to receive messages in a second reception mode; determine a transmission mode for transmitting a wireless access in vehicular environments service advertisement (WSA) message based on the identified numbers; determine a transmission period for transmitting the WSA message based on the transmission mode; and transmit the WSA message based on the transmission mode and the transmission period, wherein a protocol used for the first reception mode is different from a protocol used for the second reception mode.

The first indicator may include information regarding a protocol used for a reception operation of the first communication node. The WSA message may further include service information for the second communication nodes or service information for the third communication nodes. The transmission mode may be determined as a first transmission mode when only the second communication nodes exist in the communication network, the transmission mode may be determined as a second transmission mode when only the third communication nodes exist in the communication network, and the transmission mode may be determined as a third transmission mode when the second communication nodes and the third communication nodes coexist in the communication network.

The WSA message only for the second communication nodes may be transmitted during the transmission period, when the transmission mode is the first transmission mode. The WSA message only for the third communication nodes may be transmitted during the transmission period, when the transmission mode is the second transmission mode. The WSA message only for the second communication nodes, the WSA message only for the third communication nodes, and the WSA message for both of the second communication nodes and the third communication nodes may be transmitted during the transmission period, when the transmission mode is the third communication node.

The transmission period may include a first transmission period in which the WSA message only for the second communication nodes is transmitted, a second transmission period in which the WSA message only for the third communication nodes is transmitted, and a third transmission period in which the WSA message for both of the second communication nodes and the third communication nodes is transmitted, and the first, second, and third periods may be determined based on a number of the second communication nodes and a number of the third communication nodes. When the number of the second communication nodes is m and the number of the third communication nodes is n, a ratio of the first, second, and third transmission periods may be determined as m:n:(m+n).

According to the exemplary embodiments of the present disclosure, the communication node may be configured to adjust the transmission periods of the WSA messages based on a ratio of the reception modes of the communication nodes existing in the communication network. Therefore, the communication node may efficiently transmit the WSA messages. In addition, the communication node may efficiently manage and use control channel (CCH) resources through which the WSA messages are transmitted and received. Further, the communication node may provide smooth cooperative-intelligent transport system (C-ITS) services by efficiently transmitting the WSA messages.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Figure 1:
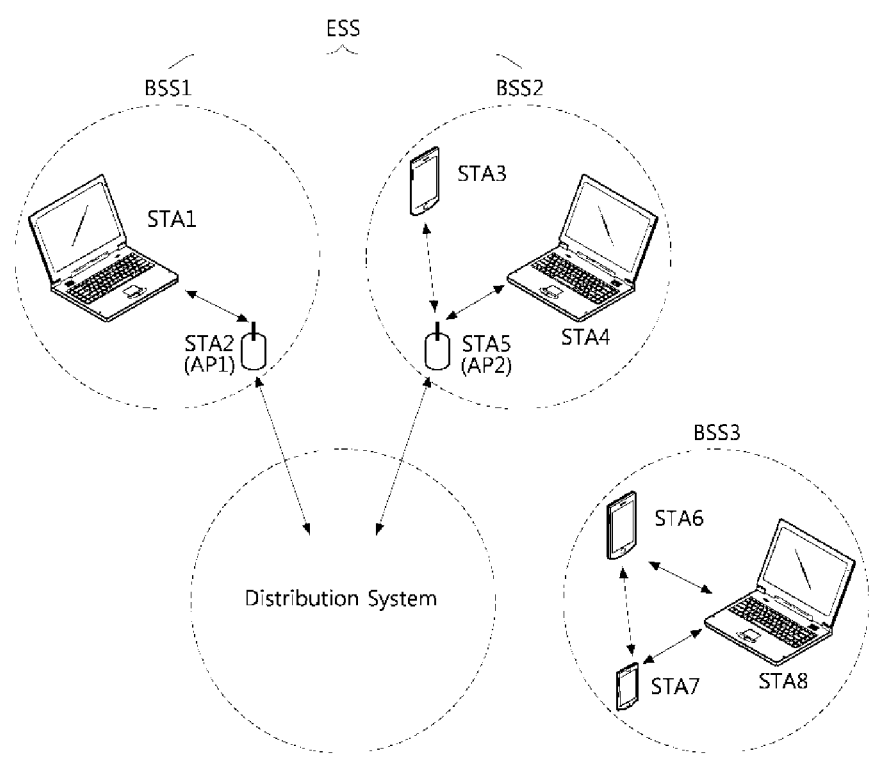
FIG. 1 is a conceptual diagram illustrating a first exemplary embodiment of a WLAN system.

Hereinafter, exemplary embodiments of the present disclosure will be described in detail with reference to the accompanying drawings. As those skilled in the art would realize, the described exemplary embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A communication system (e.g., a WLAN system) to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. In particular, the communication system may be used in the same sense as the communication network.

FIG. 1 is a conceptual diagram illustrating a first exemplary embodiment of a WLAN system. As shown in FIG. 1, a WLAN system may include at least one basic service set (BSS). The BSS denotes a set of STAs (e.g., STA1, STA2 (i.e., AP1), STA3, STA4, and STA5 (i.e., AP2), STA6, STA7, and STA8) capable of communicating with each other through successful synchronization, and is not a concept that denotes a specific area. In exemplary embodiments below, a station that performs a function of an access point may be referred to as an 'access point (AP)', and a station that does not perform the function of an access point may be referred to as a 'non-AP station' or simply 'station'.

The BSSs may be classified as infrastructure BSSs and independent BSSs (IBSSs). In particular, a BSS1 and a BSS2 may be infrastructure BSSs, and a BSS3 may be an IBSS. The BSS1 may include the station STA1, the access point STA2 (i.e., AP1) that provides a distribution service, and a distribution system (DS) that connects the plurality of access points STA2 (i.e., AP1) and STA5 (i.e., AP2). In the BSS1, the access point STA2 (i.e., AP1) may be configured to manage the STA1.

The BSS2 may include the STA3 and the STA4, the access point STA5 (i.e., AP2) that provides the distribution service, and the distribution system that connects the plurality of access points STA2 (i.e., AP1) and STA5 (i.e., AP2). In the BSS2, the access point STA5 (i.e., AP2) may be configured to manage the STA3 and the STA4. The BSS3 may be an IBSS operating in an ad-hoc mode. In the BSS3, there is no AP which is an entity that performs a management function at a center. In other words, in the BSS3, the stations STA6, STA7, and STA8 may be managed in a distributed manner. In the BSS3, all the stations STA6, STA7, and STA8 may be mobile stations and may be not allowed to connect to the DS, thus constituting a self-contained network.

The access points STA2 (i.e., AP1) and STA5 (i.e., AP2) may provide access to the DS via a wireless medium for the stations STA1, STA3, and STA4 connected thereto. Communications between the stations STA1, STA3, and STA4 in the BSS1 or the BSS2 may be generally performed through the access points STA2 (i.e., AP1) and STA5 (i.e., AP2), but when a direct link is established, direct communications between the stations STA1, STA3, and STA4 are also possible. A plurality of infrastructure BSSs may be interconnected via a DS. A plurality of BSSs connected via a DS may be referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may be configured to move from one BSS to another BSS while performing seamless communication.

The DS is a mechanism for an AP to communicate with another AP, in which the AP may be configured to transmit a frame for stations connected to a BSS managed by the AP or may be configured to transmit a frame for an arbitrary station having moved to another BSS. Additionally, the AP may be configured to exchange frames with an external network, such as a wired network. The DS is not necessarily a network, and has any form capable of providing a predetermined distribution service defined in an IEEE 802.11 standard. For example, a DS may be a wireless network, such as a mesh network, or a physical structure that connects APs with each other. Each of the communication nodes STA1, STA2 (i.e., AP1), STA3, STA4, STA5 (i.e., AP2), STA6, STAT, and STA8 included in the WLAN system may be configured as follows.

Figure 2:
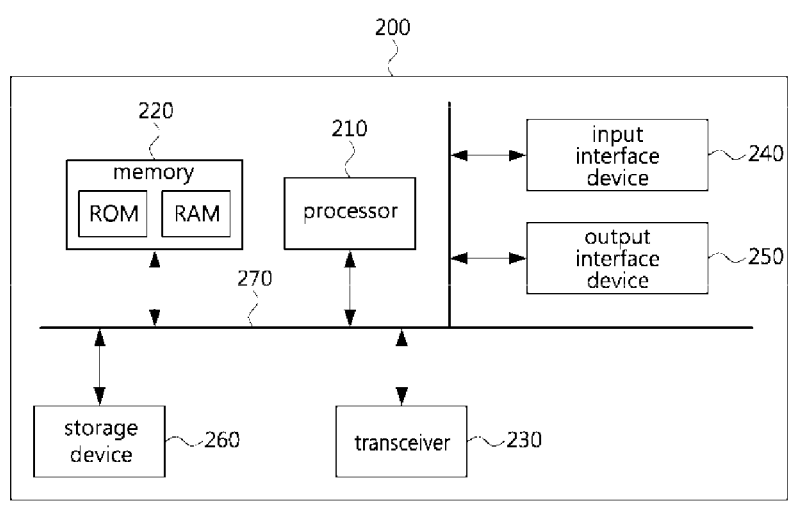
FIG. 2 is a block diagram illustrating an exemplary embodiment of a communication node of a WLAN system.

FIG. 2 is a block diagram illustrating an exemplary embodiment of a communication node forming a WLAN system. As shown in FIG. 2, a communication node 200 may include at least one processor 210, a memory 220, and a transceiver 230 connected to a network for performing communications. The transceiver 230 may also be referred to as a 'radio frequency (RF) unit', 'RF module', or the like. Additionally, the communication node 200 may further include an input interface device 240, an output interface device 250, a storage device 260, and the like. Each component included in the communication node 200 may be configured to communicate with each other as connected via a bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may be configured to execute at least one instruction stored in at least one of the memory 220 and the storage device 260. The processor 210 may refer to a central processing unit (CPU), a graphics processing unit (GPU), or a dedicated processor on which methods in accordance with exemplary embodiments of the present disclosure are performed. Each of the memory 220 and the storage device 260 may include at least one of a volatile storage medium and a non-volatile storage medium. For example, the memory 220 may include at least one of read-only memory (ROM) and random access memory (RAM).

Figure 3:
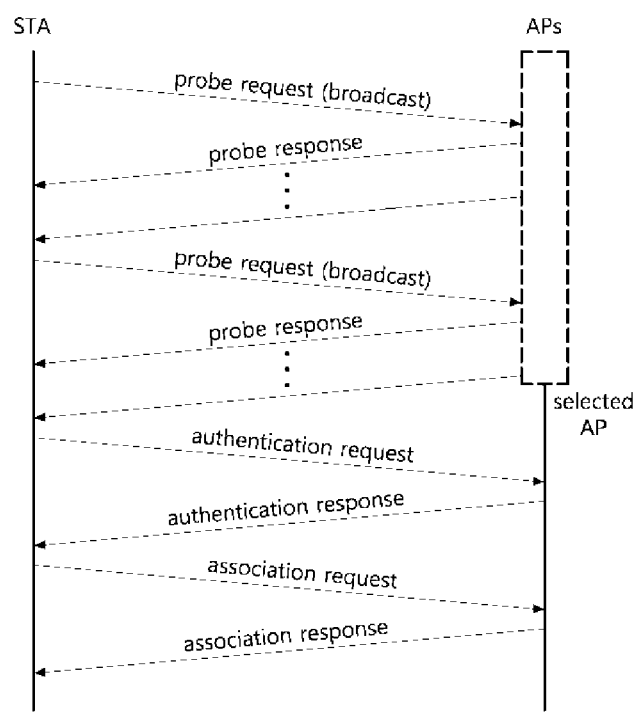
FIG. 3 is a sequence chart illustrating an association procedure of a station in a WLAN system according to an exemplary embodiment.

Meanwhile, in the WLAN system, an association procedure may be performed as follows. FIG. 3 is a sequence chart illustrating an association procedure of a station in a WLAN system. As shown in FIG. 3, an association procedure of a station STA in an infrastructure BSS is generally divided into a probe step of probing an AP, an authentication step for authentication with the probed AP, and an association step of associating with the authenticated AP.

The station STA may first probe neighboring APs through a probe process. The probe process may be performed in a passive scanning scheme or an active scanning scheme. The passive scanning scheme may be performed by overhearing beacons transmitted by the neighboring APs. On the other hand, the active scanning scheme may be performed by broadcasting a probe request frame. The APs receiving the probe request frame may be configured to transmit probe response frames that corresponds to the probe request frame to the station STA. The station STA may be configured to recognize the presence of the neighboring APs by receiving the probe response frames.

Subsequently, the station STA may be configured to perform an authentication with a probed AP, and perform an authentication with the plurality of probed APs. Authentication algorithms conforming to an IEEE 802.11 standard may be classified as an open system algorithm for exchanging two authentication frames and a shared key algorithm for exchanging four authentication frames. Through a process of exchanging an authentication request frame and an authentication response frame based on such authentication algorithms according to an IEEE 802.1 standard, the station STA may complete an authentication with an AP.

When authentication with the access point (AP) is completed, the station STA may be configured to perform an association step with the access point (AP). In particular, the station STA may be configured to select one access point AP among the access points APs which have performed the authentication step with itself, and perform the association step with the selected access point AP. In other words, the station STA may be configured to transmit an association request frame to the selected AP and receive an association response frame that is a response to the association request frame from the selected AP, to thus complete the association with the selected AP.

Meanwhile, a communication node (e.g., an access point, a station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA). The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. It may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frames. The QoS data frame may indicate a data frame for which transmission according to QoS is required, and the non-QoS data frame may indicate a data frame for which transmission according to QoS is not required.

Figure 4:
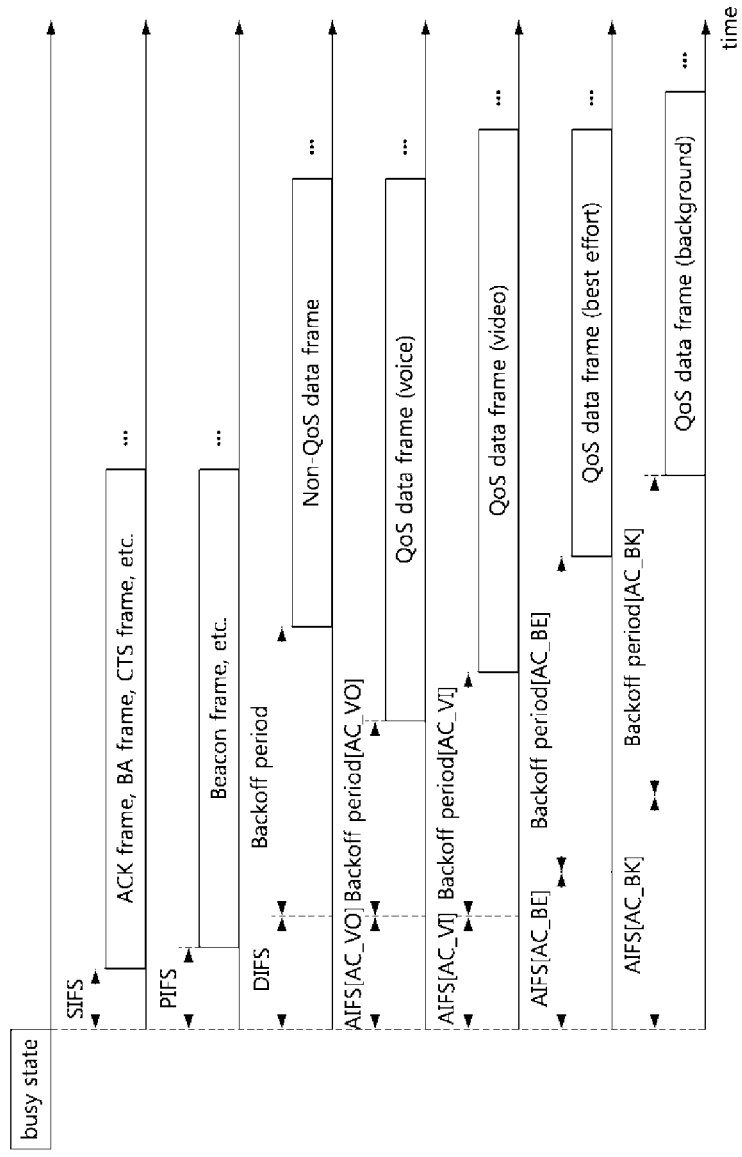
FIG. 4 is a timing diagram illustrating a first exemplary embodiment of an operation method of a communication node based on an EDCA.

Meanwhile, in the WLAN system, a communication node (e.g., an access point or a station) may be configured to operate based on the EDCA. FIG. 4 is a timing diagram illustrating a first exemplary embodiment of an operation method of a communication node based on an EDCA. As shown in FIG. 4, a communication node that intends to transmit a control frame (or a management frame) may be configured to perform a monitoring operation (e.g., carrier sensing operation) on a channel state during a predetermined period (e.g., a short interframe space (SIFS) or a PCF IFS (PIFS)).

When the channel state is determined to be an idle state during the predetermined period (e.g., SIFS or PIFS), the communication node may be configured to transmit a control frame (or a management frame). For example, the communication node may be configured to transmit an ACK frame, a BA frame, a CTS frame, or the like when the channel state is determined to be an idle state during an SIFS. Additionally, the communication node (e.g., AP) may be configured to transmit a beacon frame or the like when the channel state is determined to be an idle state during a PIFS. On the other hand, when the channel state is determined to be busy during the predetermined period (e.g., SIFS or PIFS), the communication node may not transmit a control frame (or a management frame). In particular, the carrier sensing operation may be referred to as a 'clear channel assessment (CCA) operation'.

A communication node that intends to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window according to the random backoff procedure, and perform the monitoring operation (e.g., carrier sensing operation) during a period that corresponds to the selected backoff value. The communication node may be configured to transmit a non-QoS data frame when the channel state is determined to be an idle state during the backoff period.

A communication node that intends to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set according to an access category (AC) of a data unit (e.g., a protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | AC_VI | Video |
| . | AC_VO | Voice |
| Highest | | |

AC_BK may indicate background data, AC_BE may indicate data transmitted in a best effort manner, AC_VI may indicate video data, and AC_VO may indicate voice data. For example, the length of the AIFS for the QoS data frame that corresponds to each of AC_VO and AC_VI may be set equal to the length of the DIFS. The length of the AIFS for the QoS data frame that corresponds to AC_BE and AC_BK may be set longer than the length of the DIFS. In particular, the length of the AIFS for the QoS data frame that corresponds to AC_BK may be set longer than the length of the AIFS for the QoS data frame that corresponds to AC_BE.

In the random backoff procedure, the communication node may be configured to select a backoff value (e.g., backoff counter) within a contention window according to the AC of the QoS data frame. The contention window according to the AC may be as shown in Table 2 below. Particularly, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be in an idle state during the backoff period.

Hereinafter, operation methods of a communication node according to exemplary embodiments of the present disclosure will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a non-AP station is described, the corresponding AP may be configured to perform an operation corresponding to the operation of the non-AP station. Conversely, when an operation of the AP is described, the corresponding non-AP station may be configured to perform an operation corresponding to the operation of the AP.

In the following, a wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

Figure 5:
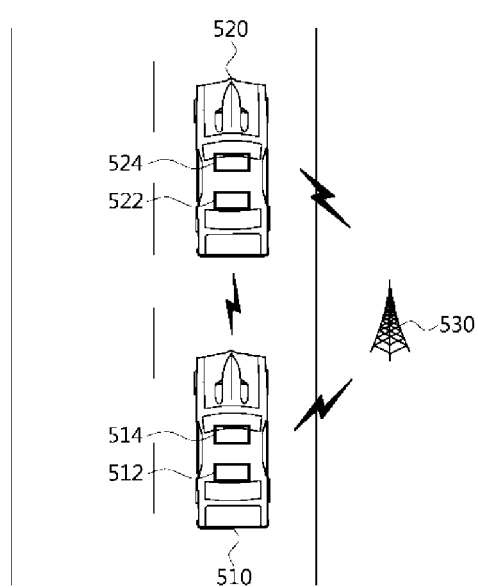
FIG. 5 is a conceptual diagram illustrating a communication network including communication nodes according to an exemplary embodiment.

FIG. 5 is a conceptual diagram illustrating a communication network including communication nodes. As shown in FIG. 5, vehicles 510 and 520 may be driving on a road, and a roadside unit (RSU) 530 may be located on a side of the road. The vehicles 510 and 520 may include vehicle terminals 512 and 522 and external devices 514 and 524, respectively. The communication network may include the vehicle terminals 512 and 522, the external devices 514 and 524, and the RSU 530.

The vehicle terminals 512 and 522 may be on-board equipment (OBEs) mounted within the respective vehicles 510 and 520. The vehicle terminals 512 and 522 may be configured to receive relevant data according to an information service provided by the RSU 530 and activate the corresponding service to output various information. The information that the vehicle terminals 512 and 522 output by activating the service may include traffic-related information and also information related to gas stations, rest areas, vehicle repair shops, weather, and the like. The vehicle terminals 512 and 522 may be configured to perform wireless communications with the RSU 530. In addition, wireless communications between the vehicle terminals 512 and 522 may be performed. Each of the vehicle terminals 512 and 522 may have a communication interface therefor.

The vehicle terminal 512 may be configured to perform wireless communication with the vehicle terminal 522 or the RSU 530 using a Wireless Access in Vehicular Environments (WAVE) communication scheme. The WAVE may enable the wireless communications between the RSU 530 and the vehicle terminals 512 and 522 to be performed smoothly in an environment where the positions of the terminals change severely and information needs to be exchanged therebetween in a short period of time.

The external devices 514 and 524 may be disposed within the vehicles 510 and 520 in which the vehicle terminals 512 and 522 are mounted to perform wired or wireless communications. The external devices 514 and 524 may not be equipped with the WAVE communication function. The external devices 514 and 524 may be devices that may be disposed in the vehicles 510 and 520, such as smart phones, mobile phones, navigation systems, black boxes, tablets, and laptops.

The external devices 514 and 524 may be configured to communicate with the vehicle terminals 512 and 522 using Ethernet/Wireless Fidelity (Wi-Fi) or a user datagram protocol (UDP). The vehicle terminals 512 and 522 may be configured to communicate with the external devices 514 and 524 mounted on the vehicles 510 and 520. The vehicle terminals 512 and 522 may be configured to transmit and receive data using the Ethernet/Wi-Fi or the UDP. In particular, the external devices 514 and 524 may be provided with the WAVE communication service via the vehicle terminals 512 and 522 having the WAVE communication function.

The RSU 530 may be configured to perform wireless communication with the vehicle terminals 512 and 522 mounted on the vehicles 510 and 520 being driven on the road. The RSU 530 may be an ITS base station located within a certain distance along the road. The ITS may refer to an intelligent transport system capable of comprehensively collecting and providing traffic information by applying information and communication technologies. Therefore, the ITS may be a system that may effectively solve problems such as traffic jams. The RSU 530 may be one type of RSU (Road Side Unit). Roadside base station 530 may be a service (e.g., traffic information service) to vehicle terminals 512 and 522 mounted on vehicles 510 and 520 based on service information stored therein or service information provided by an external server. The RSU 530 may include a communication interface for wireless communication with the vehicle terminals 510 and 520.

Figure 6:
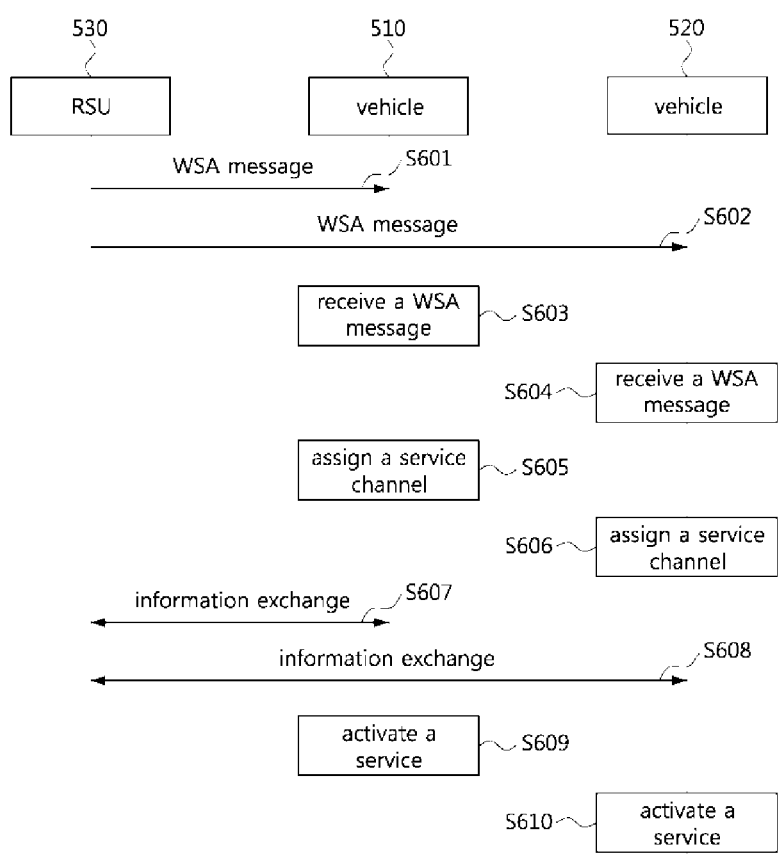
FIG. 6 is a sequence chart illustrating operation methods of communication nodes in a communication network according to an exemplary embodiment.

FIG. 6 is a sequence chart illustrating operation methods of communication nodes in a communication network. As shown in FIG. 6, the RSU 530 may be configured to periodically transmit WSA messages including information on services that the RSU 530 is capable of providing through a control channel (CCH) (S601, S602). More specifically, the RSU 530 may be configured to periodically broadcast the WSA message to vehicles entering within its communication range via a control channel. The vehicle terminals 512 and 522 mounted on the vehicles 510 and 520 may be configured to continuously monitor the control channel until accessing the RSU 530. The vehicles 510 and 520 may be configured to monitor the control channel, and in response to entering a radio wave arrival range of the RSU 530, the vehicles 510 and 520 may be configured to receive the WSA message via the monitored control channel (S603, S604).

Meanwhile, modes for receiving a WSA message may be different between the vehicle terminal 512 included within the vehicle 510 and the vehicle terminal 522 included within the vehicle 520. In other words, protocols for receiving a WSA message may be different. For example, the vehicle terminal 512 included in the vehicle 510 may be a terminal be configured to receive a WSA message based on the IEEE 802.11p, and the vehicle terminal 522 included within the vehicle 520 may be a terminal be configured to receive a WSA message based on the IEEE 802.11bd, which is an improved version of the IEEE 802.11p. Accordingly, the vehicle terminals 512 and 522 having different data reception modes may coexist within the communication network. When the modes in which the vehicle terminals 512 and 522 receive the WSA message are different, the services for the respective vehicle terminals may be different. In particular, information included in the WSA messages transmitted for service advertisement may also be different.

In the environment where the vehicle terminals 512 and 522 having the different reception modes coexist, the RSU 530 needs to transmit the WSA message to all of the vehicle terminals 512 and 522. In other words, the RSU 530 needs to transmit an appropriate WSA message to each vehicle terminal in the steps S601 and S602.

When the RSU 530 only transmits a WSA message for vehicle terminals having a specific reception mode, only specific PHY protocol data units (PPDUs) may be transmitted. In addition, since service advertisement opportunities within a control channel (CCH) are provided non-uniformly, inefficiency of the channel may be caused. For example, only one vehicle terminal may be configured to receive the WSA message in the first reception mode around the RSU 530, and ten vehicle terminals may be configured to receive the WSA message in the second reception mode, which is different from the first reception mode. In particular, it may be preferable that the RSU 530 allows the ten vehicles to be provided with services more smoothly. In other words, the RSU 530 may be configured to transmit WSA messages based on a ratio of vehicles having different WSA message reception modes existing in the surroundings. Hereinafter, a procedure of generating and transmitting WSA messages by the RSU 530 will be described in detail with reference to FIGS. 7 to 10.

Figure 7:
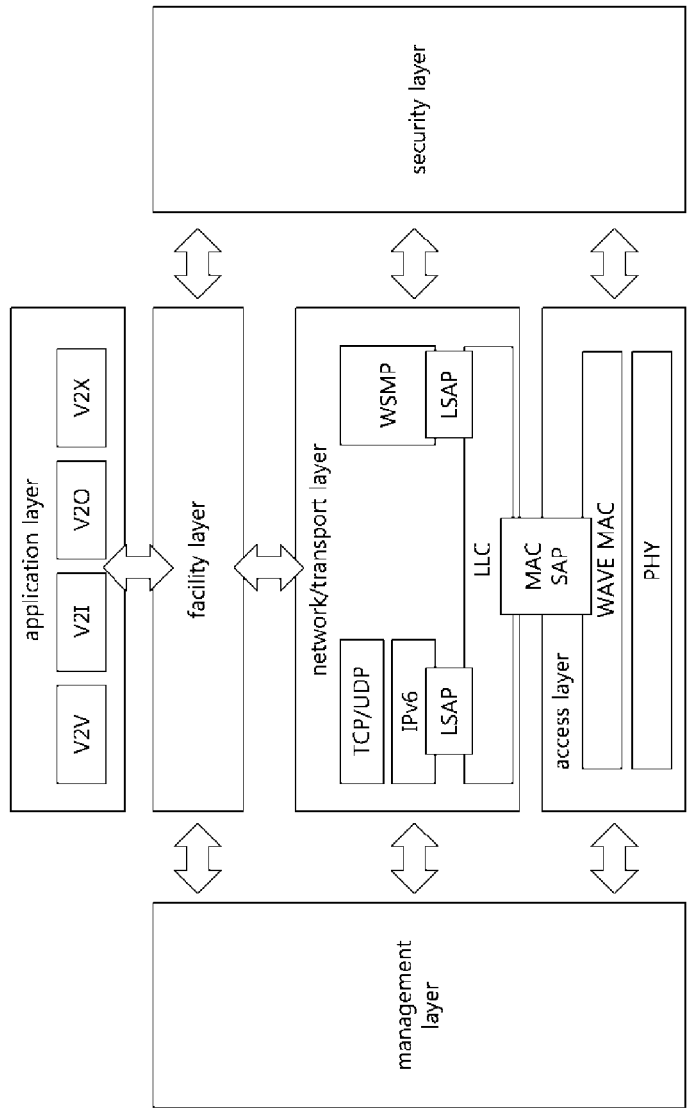
FIG. 7 is a conceptual diagram illustrating a layer structure of a communication node in a communication network according to an exemplary embodiment.

FIG. 7 is a conceptual diagram illustrating a layer structure of a communication node in a communication network. As shown in FIG. 7, a communication node performing vehicle-to-everything (V2X) communication may include an application layer that is a top layer, a UDP/TCP performing operations of a transport layer to ensure reliability of transmission of frames between communication nodes, an IPv6 performing operations of a network layer to search for a transmission path between multiple nodes, a logical link control (LLC) sublayer which is a data link layer for point-to-point transmission, a medium access control (MAC) layer, and a physical (PHY) layer for transmitting and received actual signals.

The application layer may implement and support various use cases or applications. For example, the application layer may provide various applications in the communication system, which include vehicle-to-vehicle (V2V) applications, vehicle-to-infrastructure (V2I) applications, and vehicle-to-others (V2O) applications. A facility layer may be a layer for effectively implementing the various use cases defined by the application layer. For example, the facility layer may be a layer configured to generate a message (or message set) based on information to be transmitted by the application layer, which is a higher layer.

The network/transport layer may be a layer that configures the network for V2X communication by supporting various network protocols and transport protocols. The network for V2X communication may include a homogenous network and/or a heterogeneous network. For example, the network and transport layer may provide Internet access and routing to the communication node via Internet protocols such as TCP/UDP+IPv6.

Meanwhile, for communication between the vehicle terminals, since a transmitting terminal may be configured to directly transmit a frame to a receiving terminal, it may be unnecessary to transmit the frame to the receiving terminal via another terminal. Accordingly, the communication node may not require the conventional network/transport layer and data link layer. Accordingly, to simplify the functions of the network/transport layer, some functions of the network/transport layer and the data link layer may be replaced with a WAVE short message protocol (WSMP).

An access layer may be a layer that transmits a message/data received from higher layers through a physical channel. For example, the access layer may support communication technologies based on the IEEE 802.11 and/or 802.11p standards, communication technologies based on the IEEE 1609 and/or IEEE 1609.4 standards, and the like. In addition, the access layer may be configured to transmit messages and/or data through a physical channel. The access layer may include the MAC layer and the PHY layer. The MAC layer of the communication node forming the V2X communication system may be a WSMP MAC layer. Each layer may be configured to transmit data and/or signals to a lower layer as described below.

Each of the layers forming the communication node may be configured to transmit corresponding data and additional information via a service access point (SAP). For example, the LLC layer may be configured to acquire data and parameters such as a source address and a destination address from the WSMP or IPv6 via a link service access point (LSAP). In particular, the LLC layer may be configured to acquire channel load information measured at the communication node from the WSMP through the LSAP. The LSAP used in the WAVE may be the same as the SAP used in the existing WLAN except a DL-UNITDATA.req primitive, which includes parameters received from the higher layer. The DL-UNITDATA.req primitive may further include parameters for a WAVE-related operation, and may be delivered in form of a DL-UNITDATAX.req primitive. The DL-UNITDATAX.req primitive may include the parameters in Table 3.

TABLE 3

| Parameter | Description |
| --- | --- |
| Source_address | Indicate a source address |
| Destination_addresss | Indicate a destination address |
| data | The same as the existing WLAN |
| priority | Indicate priorities between communication nodes |

TABLE 3-continued

| Parameter | Description |
| --- | --- |
| Channel identifier | Indicate a channel through which WSA is transmitted |
| Time slot | Indicate a time slot (time slot 0 or time slot 1) in which the corresponding message is transmitted in combination with a channel switching of WAVE |
| Data rate | Indicate a data rate used for transmitting WSA |
| TxPwr level | Indicate a transmission power used for transmitting WSA |
| Channel load | Indicate a channel load measured (or recognized) by the communication node |
| WsmExpiryTime | Selectively included when transmitted as a WSMP, and a frame is not transmitted after the corresponding time expires |

In Table 3, the channel load among the parameters delivered via the LSAP may indicate a congestion of the channel. The channel load may be transferred to another terminal as included in a WSMP message and, or transferred to the MAC layer via a MAC SAP and utilized to perform operations according to a channel state. The channel load may be information obtained using the channel load parameter of the DL-UNITDATAX.req primitive through the LSAP. The channel load may be delivered to the MAC layer by adding a channel load parameter to the MA-UNITDATA.req primitive of the MAC SAP of the existing WLAN.

A management layer may be a layer configured to manage the operations of the layers included in the communication node. The management layer may be configured to provide services and information for management and operation of the facility layer through an interface between management entity and facility (MF) layer (or, MF-SAP). In addition, the management layer may be configured to provide services and information for management and operation of the network/transport layer and the access layer through an interface with the network/transport layer and the access layer. Depending on the role thereof, the management layer may be divided into a WAVE management entity (WME) layer, a WAVE management information base (WME-MIB) layer, and a MAC sublayer management entity extension (MLMEX) layer.

A security layer may be a layer that manages security-related information of the layers included in the communication node. The security layer may provide services and information for security of the facility layer through an interface between security entity and facility layer (SF) (or MF-SAP). In addition, the security layer may be configured to provide information regarding security of the network/transport layer and the access layer through interfaces with the network/transport layer and the access layer.

Figure 8:
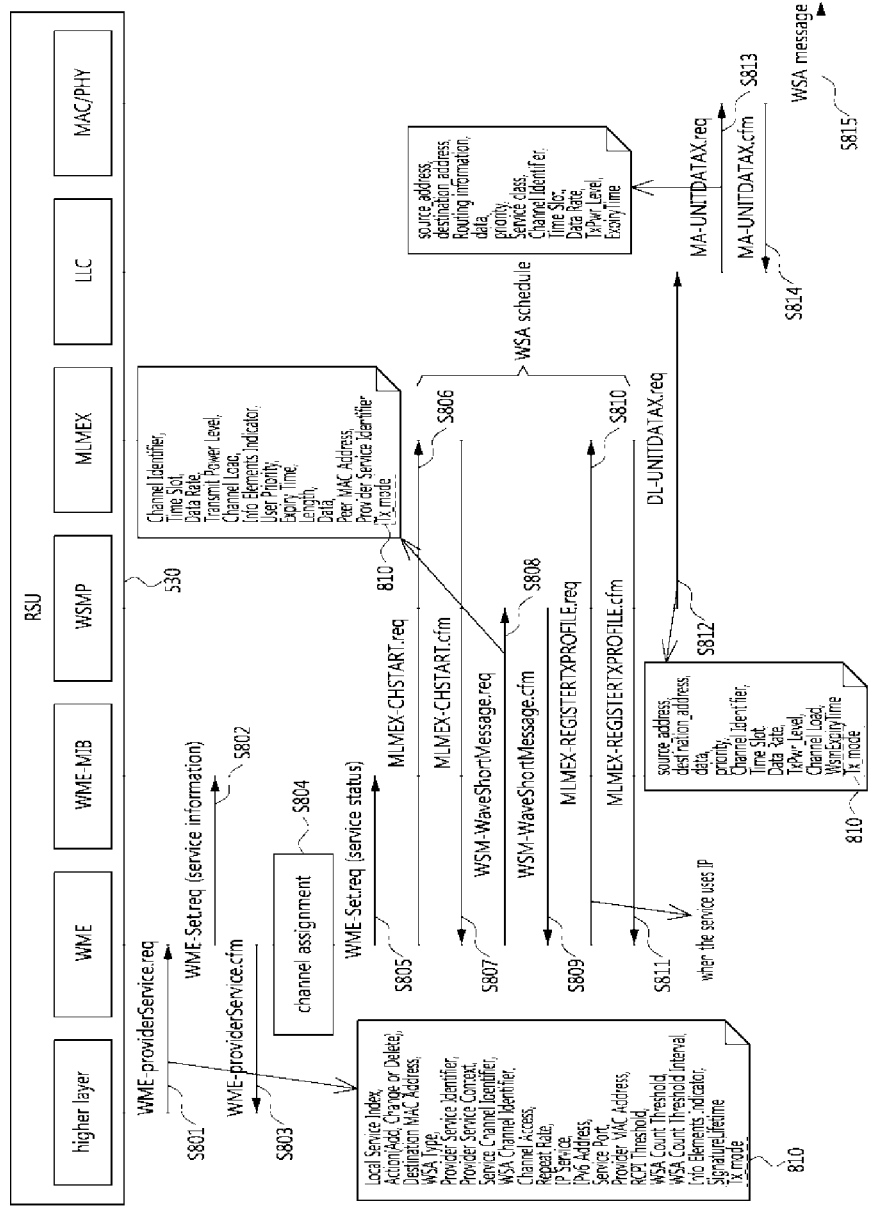
FIGS. 8 and 9 are sequence charts illustrating an operation performed by a communication node to transmit WSA messages in a communication network according to an exemplary embodiment.
Figure 9:
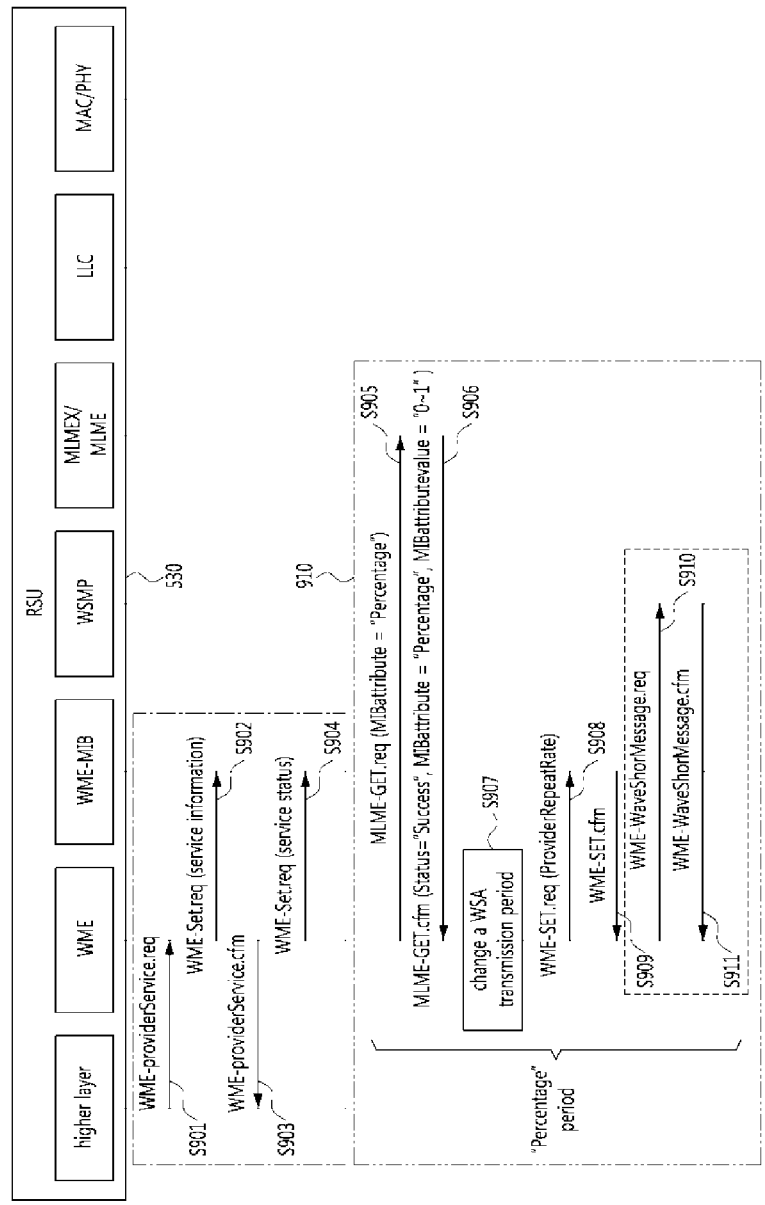

FIGS. 8 and 9 are sequence charts illustrating an operation performed by a communication node to transmit WSA messages in a communication network. More specifically, FIG. 8 illustrates a procedure in which a communication node configures a transmission mode for transmitting WSA messages, and FIG. 9 illustrating a procedure in which a communication node configures a transmission period for transmitting WSA messages.

As shown in FIG. 8, the higher layer (e.g., application layer) of the RSU 530 may be configured to request a service to the WME layer via a WME-ProviderService.req primitive (S801). The WME-ProviderService.req primitive may include an indicator (e.g., Tx_mode) 810 that indicates a transmission mode. The indicator 810 may be an indicator for the RSU 530 to determine a transmission mode for transmitting WSA messages.

Meanwhile, the higher layer may be configured to determine the transmission mode of the WSA message. The higher layer may configure the indicator 810 that indicates the transmission mode based on service information (e.g., contents) included in the WSA message. The indicator 810 determining the transmission mode of the WSA message may be delivered as included in a ProviderService.req primitive. Thereafter, the RSU 530 may be configured to determine the transmission mode of the WSA message based on the indicator 810.

For example, when the service included in the WSA message is a service for only communication nodes that support a first reception mode (e.g., terminals based on the IEEE 802.11p), the RSU 530 may be configured to transmit the WSA message in a first transmission mode. The first transmission mode may be a mode that is configured when only communication nodes that support the first reception mode exist in the communication network. When the service included in the WSA message is a service for only communication nodes that support a second reception mode (e.g., terminals based on the IEEE 802.11bd), the RSU 530 may be configured to transmit the WSA message in a second transmission mode. The second transmission mode may be a mode that is configured when only communication nodes supporting the second reception mode exist in the communication network.

When the service included in the WSA message supports a service for the communication nodes that support the first reception mode, a service for the communication nodes that support the second reception mode, and a service for both of the communication nodes that support the first reception mode and the communication nodes that support the second reception mode (i.e., when the service included in the WSA message includes services having similar requirements or a common service), the RSU 530 may be configured to transmit the WSA message in a third transmission mode. The third transmission mode may be a mode that is configured when the communication nodes that support the first reception mode and the communication nodes that support the second reception mode coexist in the communication network. Meanwhile, the third transmission mode may be the same as one of the first transmission mode and the second transmission mode, or may be different from the first transmission mode and the second transmission.

The WME layer may be configured to deliver a service to be provided via a WME-Set.req primitive to the WME-MIB layer (S802). The WME-MIB layer may be configured to register the delivered service. The WME layer may be configured to manage management information through the WME-MIB layer. The WME layer may respond to the service request to the higher layer through a WME-ProviderService.cfm primitive (S803). The WME layer may be configured to assign a channel for transmitting the WSA message (S804). Additionally, the WME layer may be configured to deliver a service status to the WME-MIB layer via a WME-Set.req primitive (S805). The WME-MIB layer may be configured to register the delivered service status.

The WME layer may be configured to perform scheduling of the WSA message through a MLMEX-CHSTART.req primitive and a MLMEX-CHSTART.cfm primitives (S806, S807) with the MLMEX layer, a WSM-WaveShortMessage.req primitive and a WSM-WaveShortMessage.cfm primitive (S808, S809) with the WSMP layer, and a MLMEX-REGISTERTXPROFILE.req primitive and a MLMEX-REGISTERTXPROFILE.cfm primitives (S810, S811) with the MLMEX layer.

The WSM-WaveShortMessage.req primitive may include an indicator (e.g., Tx_mode) 810 that indicates the transmission mode. The indicator 810 determining the transmission mode of the WSA message may be delivered as included in the WSM-WaveShortMessage.req primitive. The WSMP layer may be configured to deliver a data packet to the LLC layer via a DL-UNITDATAX.req primitive (S812). The DL-UNITDATAX.req primitive may include an indicator (e.g., Tx_mode) 810 that indicates the transmission mode. The indicator 810 configured to determine the transmission mode of the WSA message may be delivered as included in the DL-UNITDATAX.req primitive.

The LLC layer may be configured to deliver a packet to the MAC/PHY layer via a MA-UNITDATAX.req primitive (S813). The MAC/PHY layer may be configured to deliver a response to the MA-UNITDATAX.req primitive via a MA-UNITDATAX.req primitive (S814). The MAC/PHY layer may be configured to transmit the WSA message via a control channel (CCH) according to a configured transmission period (S815). In other words, the RSU 530 may be configured to inform the communication nodes of its service type via the WSA message.

As shown in FIG. 9, the communication node may configure a transmission period for transmitting the WSA message. Steps S901 to S904 performed by the layers of the RSU 530 may be similar to the steps S801 to S804 of FIG. 8. The RSU 530 may be configured to repeatedly perform the steps S901 to S904 to register WSA messages received in different modes in the WME.

The WME layer may be configured to request the MLMEX layer (or MLME layer) to configure a transmission period indicator 910 via a MLME-GET.req primitive (S905). The transmission period indicator 910 may be denoted as a 'Percentage'. The MLMEX/MLME layer may be configured to transmit a response to the MLME-GET.req primitive through a MLME-GET.cfm primitive (S906).

When the transmission mode in which the RSU 530 transmits the WSA message is the first transmission mode, the transmission period indicator may be set to '0' (i.e., 'Percentage' may be set to '0'). In particular, the RSU 530 may be configured to transmit the WSA message only for the communication nodes that receive the WSA message in the first reception mode during the transmission period. When the transmission mode in which the RSU 530 transmits the WSA message is the second transmission mode, the transmission period indicator may be set to '1' (i.e., 'Percentage' may be set to '1'). In particular, the RSU 530 may be configured to transmit the WSA message only for the communication nodes that receive the WSA message in the second reception mode during the transmission period.

When the transmission mode in which the RSU 530 transmits the WSA message is the third transmission mode, the transmission period indicator may be set to a value greater than 0 and less than 1 (i.e., 'Percentage' may be set to a value between 0 and 1). In particular, the RSU 530 may be configured to transmit, during the transmission period, the WSA message only for the communication nodes that receive the WSA message in the first reception mode, the WSA message only for the communication nodes that receive the WSA message in the second reception mode, and the WSA message for both the communication nodes that receive the WSA message in the first reception mode and the communication nodes that receive the WSA message in the second reception mode.

As described above, when the RSU 530 transmits the WSA message in the third transmission mode, unlike the first transmission mode and the second transmission mode, three types of WSA messages may be transmitted. The RSU 530 may be configured to adjust a period in which each of the three types of WSA messages is transmitted. The RSU 530 may be configured to determine the periods in which the three types of WSA messages are respectively transmitted based on the number of the second communication nodes receiving the WSA message in the first reception mode and the number of third communication nodes receiving the WSA message in the second reception mode.

For example, when the number of the second communication nodes is m and the number of the third communication nodes is n, a ratio of the periods in which the WSA message only for the second communication nodes may be transmitted, the periods in which the WSA message only for the third communication nodes may be transmitted, and the periods in which the WSA message for both of the second communication nodes and the third communication nodes may be transmitted may be m:n:(m+n). In other words, the transmission periods of each WSA message may be determined in proportion to the number of communication nodes having the same reception mode existing in the communication network. The WME layer may configure the period in which each WSA message is transmitted based on the configured transmission period indicator 910 (S907).

Meanwhile, in consideration of a repetition rate (hereinafter, 'repeat rate') of each type of WSA messages, the ratio of the transmission periods of the WSA messages may be determined. The WME layer may be configured to transfer a repeat rate to the WME-MIB layer through the WME-SET.req primitive (S908). The WME-MIB layer may be configured to register the transferred repeat rate. The WME-MIB layer may be configured to deliver a response to S908 to the WME layer through a WME-SET.cfm primitive (S909). Particularly, the repeat rate may refer to the number of times the advertisement message is transmitted every about 5 seconds, and the repeat rate may be information included in the WME-providerService.req primitive of FIG. 8.

For example, the repeat rates of the WSA messages for only the m second communication nodes that receive the WSA message in the first reception mode may be $a_1$, $a_2$, $a_3$, ..., and $a_m$, respectively, the repeat rates of the WSA messages for only the third communication nodes that receive the WSA message in the second reception mode may be $b_1$, $b_2$, $b_3$, ..., and $b_n$, respectively, and the repeat rates of the WSA messages for both of the second communication nodes that receive the WSA message in the first reception mode and the third communication nodes that receive the WSA message in the second reception mode may be $c_1$, $c_2$, $c_3$, ..., and $c_{m+n}$, respectively. In particular, a ratio of $(a_1+a_2+a_3+ \ldots, a_m):(b_1+b_2+b_3+ \ldots, b_n):(c_1+c_2+c_3+\ldots+c_{m+n})$ may be established, and accordingly, the transmission periods for the WSA messages only for the second communication nodes, the WSA messages only for the third communication nodes, and the WSA messages for both of the second communication nodes and the third communication nodes may be configured based on the ratio.

The WME layer may be configured to deliver a data packet to the WSMP layer via a WME-WaveShorMessage.req primitive (S910). The WSMP layer may be configured to deliver a response to S910 to the WME layer via a WME-WaveShorMessage.cfm primitive (S911). The steps S910 and S911 may be repeated whenever the Repeat rate value for transmission of the WSA message is changed. Meanwhile, the steps S905 to S911 may be repeatedly performed for each update period of the transmission period indicator 910.

Figure 10:
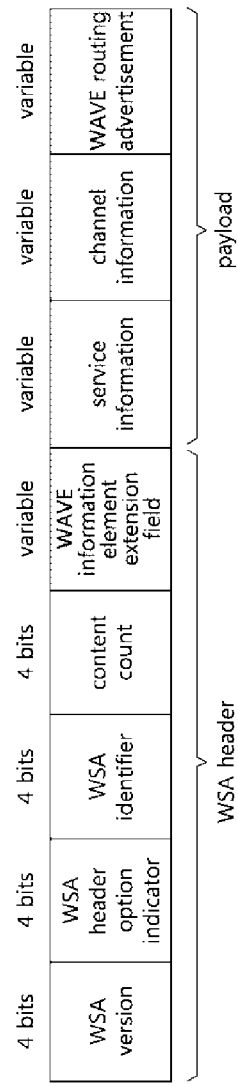
FIG. 10 is a conceptual diagram illustrating a structure of a WSA message according to an exemplary embodiment.

Referring back to FIG. 6, the vehicles 510 and 520 may be configured to receive the WSA messages from the RSU 530 (S603 and S604). FIG. 10 is a conceptual diagram illustrating a structure of a WSA message. As shown in FIG. 10, the WSA message transmitted by the RSU 530 may include a WSA header and a payload. Particularly, the WSA header may include a WSA version field, a WSA header option indicator field, a WSA identifier field, a content count field, and a WAVE information element extension field. The repeat rate parameter may be included in the WAVE information element extension field, and the RSU 530 may be configured to determine the transmission period indicator based on the repeat rate parameter. The indicator that indicates the transmission mode and the indicator that indicates the transmission period may be included in the fields of the WSA message.

Referring back to FIG. 6, the vehicles 510 and 520 may be configured to receive the WSA message from the RSU 530, and identify the first indicator that indicates the transmission mode, and the second that indicates the transmission period included in the WSA message. The vehicle terminals 512 and 522 included in the vehicles 510 and 520 may be configured to identify the transmission mode of the WSA message indicated by the first indicator and determine whether the WSA message may be used. In particular, a procedure of determining whether the WSA message may be used may be a procedure of determining whether the transmission mode in which the RSU 530 transmits the WSA message is compatible with the mode in which the vehicle terminals 512 and 522 receive the WSA message.

The first indicator may include information regarding a protocol used for the reception operation of the communication node. In response to determining that the vehicle terminals 512 and 522 may use the WSA message, the vehicle terminals 512 and 522 may be configured to identify the transmission period of the WSA message indicated by the second indicator and receive the WSA message. Particularly, the second indicator may include information regarding the number of communication nodes performing reception operations using the same protocol.

The vehicle terminals 512 and 522 included in the vehicles 510 and 520 may be configured to activate a service channel for exchanging service information with the RSU 530 (S605 and S606). Then, the RSU 530 and the vehicle terminals 512 and 522 may be configured to exchange information through the activated service channel (S607 and S608). Thereafter, the vehicle terminals 512 and 522 may be configured to activate a service provided by the RSU 530 (S609 and S610).

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first communication node in a communication network, comprising:
identifying, by a processor, a number of second communication nodes that receive messages in a first reception mode and a number of third communication nodes that receive messages in a second reception mode;
determining, by the controller, a transmission mode for transmitting a wireless access in vehicular environments service advertisement (WSA) message based on the identified numbers;
determining, by the controller, a transmission period for transmitting the WSA message based on the transmission mode; and
transmitting, by the controller, the WSA message based on the transmission mode and the transmission period,
wherein a protocol used for the first reception mode is different from a protocol used for the second reception mode.

2. The operation method according to claim 1, wherein the WSA message further includes service information for the second communication nodes or service information for the third communication nodes.

3. The operation method according to claim 1, wherein the transmission mode is determined as a first transmission mode when the second communication nodes exist in the communication network, the transmission mode is determined as a second transmission mode when the third communication nodes exist in the communication network, and the transmission mode is determined as a third transmission mode when the second communication nodes and the third communication nodes coexist in the communication network.

4. The operation method according to claim 3, wherein the WSA message for the second communication nodes is transmitted during the transmission period, when the transmission mode is the first transmission mode.

5. The operation method according to claim 3, wherein the WSA message for the third communication nodes is transmitted during the transmission period, when the transmission mode is the second transmission mode.

6. The operation method according to claim 3, wherein the WSA message for the second communication nodes, the WSA message for the third communication nodes, and the WSA message for both of the second communication nodes and the third communication nodes are transmitted during the transmission period, when the transmission mode is the third communication node.

7. The operation method according to claim 6, wherein the transmission period includes:
a first transmission period in which the WSA message for the second communication nodes is transmitted;
a second transmission period in which the WSA message for the third communication nodes is transmitted; and
a third transmission period in which the WSA message for both of the second communication nodes and the third communication nodes is transmitted,
wherein the first, second, and third periods are determined based on a number of the second communication nodes and a number of the third communication nodes.

8. The operation method according to claim 7, wherein, when the number of the second communication nodes is m and the number of the third communication nodes is n, a ratio of the first, second, and third transmission periods is determined as m:n:(m+n).

9. The operation method according to claim 1, wherein the WSA message is transmitted via a control channel (CCH).

10. A first communication node constituting a communication system, the first communication node including a processor and a memory configured to store at least one instruction executable by the processor, wherein when executed by the processor, the at least one instruction causes the processor to:
identify a number of second communication nodes that receive messages in a first reception mode and a number of third communication nodes that receive messages in a second reception mode;
determine a transmission mode for transmitting a wireless access in vehicular environments service advertisement (WSA) message based on the identified numbers;
determine a transmission period for transmitting the WSA message based on the transmission mode; and
transmit the WSA message based on the transmission mode and the transmission period,
wherein a protocol used for the first reception mode is different from a protocol used for the second reception mode.

11. The first communication node according to claim 10, wherein the WSA message further includes service information for the second communication nodes or service information for the third communication nodes.

12. The first communication node according to claim 10, wherein the transmission mode is determined as a first transmission mode when the second communication nodes exist in the communication network, the transmission mode is determined as a second transmission mode when the third communication nodes exist in the communication network, and the transmission mode is determined as a third transmission mode when the second communication nodes and the third communication nodes coexist in the communication network.

13. The first communication node according to claim 12, wherein the WSA message for the second communication nodes is transmitted during the transmission period, when the transmission mode is the first transmission mode.

14. The first communication node according to claim 12, wherein the WSA message for the third communication nodes is transmitted during the transmission period, when the transmission mode is the second transmission mode.

15. The first communication node according to claim 12, wherein the WSA message for the second communication nodes, the WSA message for the third communication nodes, and the WSA message for both of the second communication nodes and the third communication nodes are transmitted during the transmission period, when the transmission mode is the third communication node.

16. The first communication node according to claim 15, wherein the transmission period includes a first transmission period in which the WSA message for the second communication nodes is transmitted, a second transmission period in which the WSA message for the third communication nodes is transmitted, and a third transmission period in which the WSA message for both of the second communication nodes and the third communication nodes is transmitted, and the first, second, and third periods are determined based on a number of the second communication nodes and a number of the third communication nodes.

17. The first communication node according to claim 16, wherein, when the number of the second communication nodes is m and the number of the third communication nodes is n, a ratio of the first, second, and third transmission periods is determined as m:n:(m+n).

* * * * *